United States Patent [19]

Nakajima et al.

[11] Patent Number: 5,737,646
[45] Date of Patent: Apr. 7, 1998

[54] AUTO FOCUS CAMERA IN WHICH A LENS POSITION IS CHANGEABLE IN ACCORDANCE WITH A PHOTOGRAPHING MODE

[75] Inventors: Hidekazu Nakajima, Kawachinagano; Masayuki Ikemura, Osaka; Hiroyuki Okada, Sakai, all of Japan

[73] Assignee: Minolta Co., Ltd., Osaka, Japan

[21] Appl. No.: 488,916

[22] Filed: Jun. 9, 1995

[30] Foreign Application Priority Data

| Jun. 10, 1994 | [JP] | Japan | 6-153025 |
| May 18, 1995 | [JP] | Japan | 7-145749 |

[51] Int. Cl.$^6$ .............. G03B 13/36; G03B 17/24
[52] U.S. Cl. .............. 396/104; 396/80; 355/41; 358/76
[58] Field of Search .............. 354/400, 402, 354/403, 430; 396/104, 79–80, 121, 122, 315; 355/41; 358/76

[56] References Cited

U.S. PATENT DOCUMENTS

| 4,047,187 | 9/1977 | Mashimo et al. | 354/23 |
| 4,095,241 | 6/1978 | Matsumoto | 354/31 |
| 4,609,274 | 9/1986 | Iwashita et al. | 354/400 |
| 4,636,624 | 1/1987 | Ishida et al. | |
| 4,985,723 | 1/1991 | Egawa et al. | 354/400 |
| 5,089,841 | 2/1992 | Yamada | 354/402 |
| 5,218,711 | 6/1993 | Terashita et al. | 354/430 |
| 5,319,413 | 6/1994 | Katoh et al. | 354/402 |
| 5,416,556 | 5/1995 | Suzuki et al. | 354/400 |

FOREIGN PATENT DOCUMENTS 1-12250  4/1989  Japan .

*Primary Examiner*—Safet Metjahic
*Assistant Examiner*—Michael Dalakis
*Attorney, Agent, or Firm*—Burns, Doane, Swecker & Mathis, LLP

[57] ABSTRACT

In an auto focus camera in which a lens position is changeable in accordance with a photographing mode, based on measured object distance, it is judged whether or not measuring distance can be done, and it is presumed whether or not a person is photographed. In accordance with the result of the judgment and presumption, a focal length of a photographic lens is selected. If distance measuring can not be done or distance measuring data is invalid, focusing operation is executed, based on not the measured distance data but the predetermined distance data which is suitable to a photographing mode of the camera. By this manner, it does not occur that an object image is out of focus badly and a photograph suited for operator's intention can be obtained.

16 Claims, 7 Drawing Sheets

AUTO FOCUS CAMERA IN WHICH A LENS POSITION IS CHANGEABLE IN ACCORDANCE WITH A PHOTOGRAPHING MODE

BACKGROUND OF THE INVENTION

1. Field of the Invention

The present invention relates to an auto focus camera wherein it is judged whether or not distance measuring can be done, and, in accordance with the result, setting a focal position of a photographic lens is done correctly.

2. Description of the Related Art

Conventionally, in an auto focus camera, especially which uses a passive distance measuring method, when an object having no or low contrast, is to be photographed an object distance can not be measured, or a data of the object distance becomes unreliable. In these cases, for preventing a photograph from being out of focus, the release operation is stopped, or an photographic lens is set to focus on a predetermined distance, regardless of the photographing mode (for example, reference to Japanese Utility Model Publication No.1-12250). In other words, when an image is judged to have low contrast, for example, in case of photographing with an ambient light, the predetermined distance is set at infinity, and, in case of photographing with a flash light, since persons are mainly photographed as an object, the predetermined distance is set at 3.1 meters, for example, which is a presumable object distance.

However, since cameras capable of setting many photographing modes have increased recently and photographic purposes are different respectively, it often occurs that a photograph suited for an operator's intention can not be taken, by a camera in which a focal point of the photographic lens is set indiscriminately at a predetermined distance in law contrast as above-mentioned.

SUMMARY OF THE INVENTION

The present invention is directed to solve the above-mentioned problem. An object of the present invention is to provide an auto focus camera capable of taking picture suited for each operator's intention, without being out of focus badly, by focusing operation of a photographic lens, based on a predetermined optimum distance for the photographing mode of the camera, in cases where distance measuring can not be done, or that data of a object distance is invalid.

In accomplishing the above-mentioned object, according to the present invention, an auto focus camera comprises; a measuring distance means which measures an object distance, a judging means which judges whether or not distance measuring can be done by the measuring distance means, a presuming means which presumes that a person is being photographed, a distance selecting means which selects measured distance data by the measuring distance means, when distance measuring can be done, and selects first predetermined distance data, when distance measuring can not be done and a person is being photographed, and selects second predetermined distance data when distance measuring can not be done and a person is not being photographed, and a driving means which drives a photographic lens to a focal position in accordance with the distance data selected by the distance selecting means.

According to the present invention, an auto focus camera comprises; a measuring distance means which measures an object distance, a judging means which judges whether or not distance measuring can be done by the measuring distance means, a distance selecting means which selects measured distance data by the measuring distance means when measuring distance can be done, and selects a predetermined distance data based on a focal length of a photographic lens when measuring distance can not be done, and driving means which drives the objective lens in accordance with distance data selected by the distance selecting means.

According to the present invention, an auto focus camera comprises; a measuring distance means which measures an object distance, a judging means which judges whether or not distance measuring can be done by the measuring distance means, a photographing mode selecting means which selects an ordinary mode or a close-up mode with which an object is photographed at closer range than with the ordinary mode, a distance selecting means which selects distance data measured by the measuring distance means when distance measuring can be done, and selects a predetermined distance data, corresponding to the photographing mode selected by the photographing mode selecting means, when distance measuring can not be done, and a lens driving means which drives a photographic lens to a focal point, in accordance with the distance data selected by the distance selecting means.

This object and feature of the present invention will become apparent from the following description taken in conjunction with the preferred embodiment thereof with reference to the accompanying drawings.

BRIEF DESCRIPTION OF THE DRAWINGS

FIG. 5 is a flow chart showing a procedure of camera operation when a release switch is ON.

DETAILED DESCRIPTION OF THE INVENTION

An embodiment of the present invention will be now described in the following with reference to the accompanying drawings.

Figure 1:
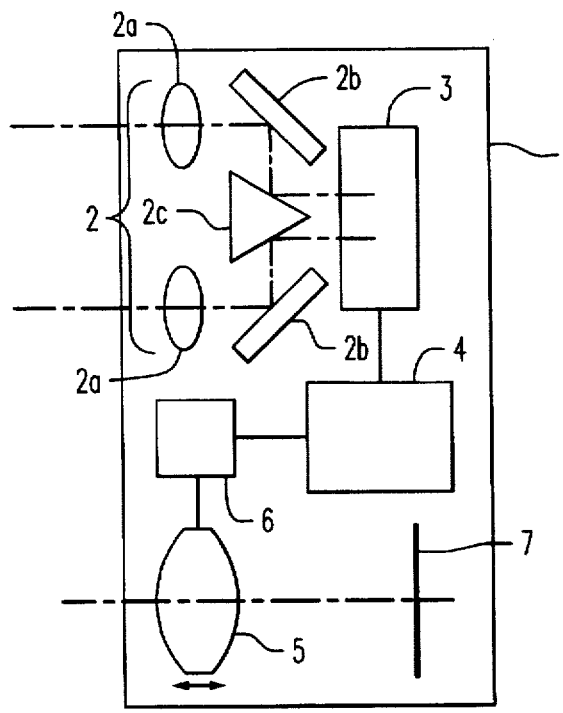
FIG. 1 is a schematic view of an auto focus camera according to an embodiment of the present invention.

FIG. 1 is a schematic view of a camera having an auto focusing apparatus according to the present embodiment. A camera body 1 comprises a passive type auto focus optical system 2 adopting a triangular distance measuring method, an image sensor 3 detecting an object image by the auto focus optical system 2, a measuring distance calculating device 4 constructed by a microprocessor and so on which calculates an object distance based on the object image detected by the image sensor 3, a lens driving device 6 driving a photographic lens 5 to a focusing position in accordance with calculated object distance, and so on. The auto focus optical system 2 is constituted by a pair of objective lenses 2a condensing object light and a pair of mirrors 2b and 2c reflecting luminous flux of condensed object light. Also, the camera comprises a shutter releasing mechanism, a flash device, an exposure control unit, a film feeding mechanism and so on.

In the above-mentioned camera, luminous flux condensed by the auto focus optical system 2 forms two object images on the image sensor 3 and, based on a distance between the object images, the measuring distance calculating means 4 calculates the object distance by below mentioned method. In accordance with the calculated object distance, the lens driving device 6 drives the object lens 5 to a focal position. By driving the object lens 5 to the focal position, object light passing through the object lens 5 forms an image on a film 7 in in-focus condition.

Figure 2:
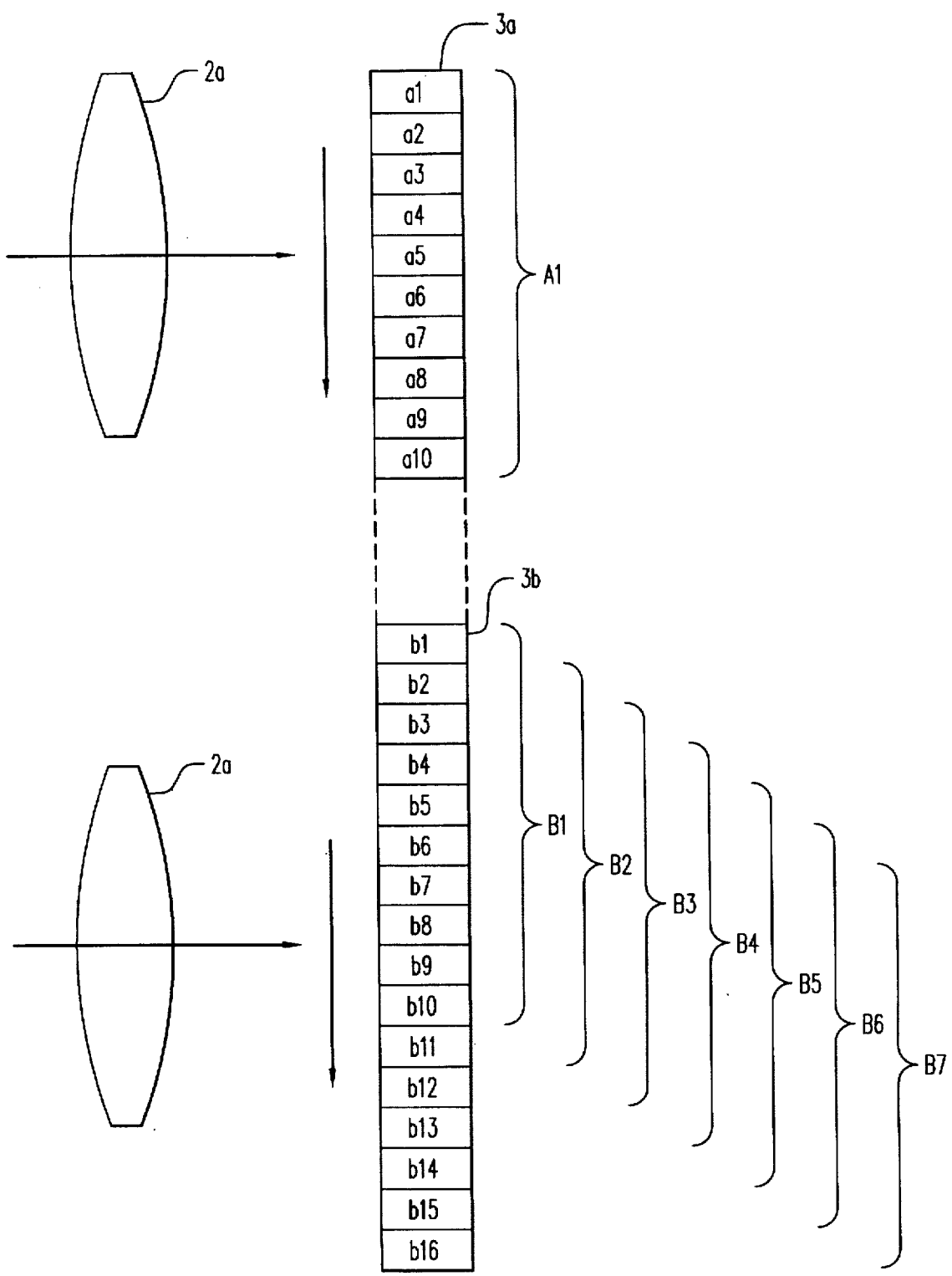
FIG. 2 is a view for explaining calculating method of an object distance.

Referring to FIG. 2, it is described a calculating method of the object distance in the auto focus optical system 2. The object image condensed by the pair of lenses 2a is projected to line sensors 3a and 3b, which is composed of CCD, constructing the image sensor 3. The sensors 3a and 3b consists of, for example, ten and sixteen pieces of photo-diode cells a1~a10, and b1~b16 respectively. Consider each of successive 10 pieces of cells in the sensor 3b, then seven sets B1 to B7 will be taken as shown in FIG. 2. The focus condition can be detected by detecting which one of the images among the seven sets most well coincides with the image on the sensor 3a. Now, for example, it is supposed that an image A1 on the sensor 3a coincides with the image on the set B3 in the sensor 3b. In this time, between each output of cell a1, a2 ... a10 and each output of cell b3, b4 ... b12, a relationship a1=b3, a2=b4 ... a10=b12 is existed, and $$S3=|a1-b3|+|a2-b4|+...+|a10-b12|=0$$

is expressed. S3 becomes smaller than the results of the similar calculation for the images on the sets other than the set B3, and the smallest of the calculated results for the images of all the sets. In order to find such a set that takes the minimum value, first, the computation as described above is performed. Next, an operation to find out the minimum value among the computed results are performed. As stated above, upon finding a set that takes the minimum value, a distance between an object image detected by the sensor 3a and an object image detected by the sensor 3b is obtained and, based on the result, an object distance is calculated.

On the other, hand in case of that the minimum value can not be detected, distance measuring is judged to be invalid. In practice, owing to an aberration of lens or difference of sensitivities included in each sensor, above described value can not become 0. Also, if an object image has low contrast or an amount of light is insufficiently, there are some cases that the above mentioned minimum value is larger than the predetermined value or can not be detected. Therefore, it is judged that distance measuring can not be done, in case not only that the minimum value can not be detected but also that the above described minimum value is larger than the predetermined value, since measured data is not reliable even if a focal point can be detected. Calculation for above mentioned distance measuring and comparison for judging whether or not distance measuring is valid are executed by the above-mentioned distance measuring calculating device 4. Also, the calculation and the comparison are not limited within the above mentioned method and other methods for them have been conventionally known. For example, a method is described in the specification of U.S. Pat. No. 4,636,624, detailed description of the method is omitted here.

Figure 3:
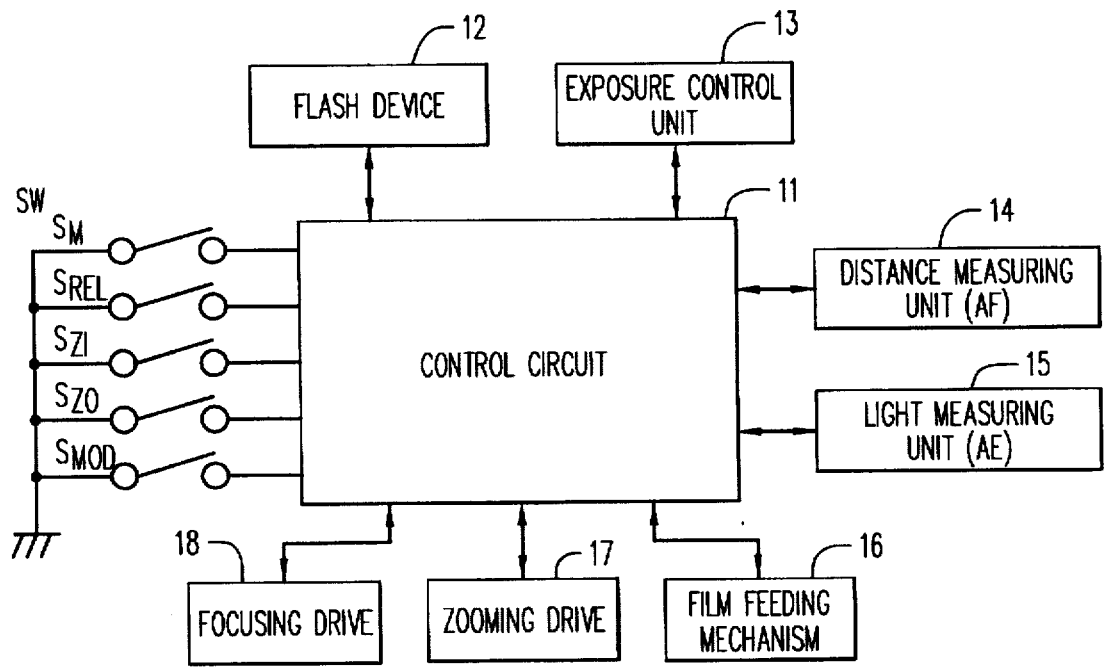
FIG. 3 is a block diagram showing a controlling circuit of the auto focus camera and its peripheral devices.

FIG. 3 is a block diagram a control circuit of the above-mentioned camera and its peripheral devices. A control circuit 11 for controlling the whole camera is composed of the microprocessor and so on, and includes the above-mentioned function of the measuring distance calculating device 4. The control circuit 11 is connected with peripheral devices as below mentioned. A flash device 12 controls firing flash upon photographing with low luminance. An exposure control unit 13 controls exposure of a film. A distance measuring unit (AF) 14 measures an object distance and includes the above-described auto focus optical system 2 and the image sensor 3. A light measuring unit (AE) 15 measures luminance of an object. A film feeding mechanism 16 winds or rewinds the film. A zoom drive 17 drives the object lens 5 for zooming. A focus drive 18 drives the object lens 5 for focusing and includes the above-stated lens driving device 6.

Also, the control circuit 11 is connected to below mentioned plural switches and, when inputted signal of state of switches, in accordance with the state of switch, the predetermined camera operation is carried out. When a main switch SM is ON, camera operation is carried out by the control circuit 11. When a release switch $S_{REL}$ is ON, a release operation is executed. A zoom in switch $S_{ZI}$ and a zoom out switch $S_{ZO}$ are for zooming operation. A mode switch $S_{MOD}$ is for changing or selecting a plurality of photographing modes provided in the camera.

The plurality of photographing modes are an ordinary mode, a self timer mode, a portrait mode, a close-up mode, a commemorative photograph mode, a slow-shutter synchronizing (hereinafter referred to as sync.) mode and so on. In the self timer mode, the release operation is started after 10 second from switching ON of the release switch $S_{REL}$. In the portrait mode, based on measured distance data, zooming operation is executed automatically to obtain the optimum image magnification (1/40) for portrait. In the close-up mode, by changing the photographic lens to close-up condition, it allows taking photograph at a close range, which is impossible to focus ordinarily, such as 0.4 meter ~0.7 meter. In the commemorative photograph mode, in case of measuring distance weighted on the center of a measuring distance area, since a main object does not exist on the center thereof, it may happen that the main object is out of focus. For preventing the main object being out of focus, the object lens is fixed to wide edge and measuring distance value is limited within 3 meter. In slow-shutter sync. mode, upon firing flash or including dark background, shutter speed is permitted to be lower than camera shake limit (1/focal length). The slow-shutter sync. mode is generally used for taking a picture of a person with a night view.

Figure 4:
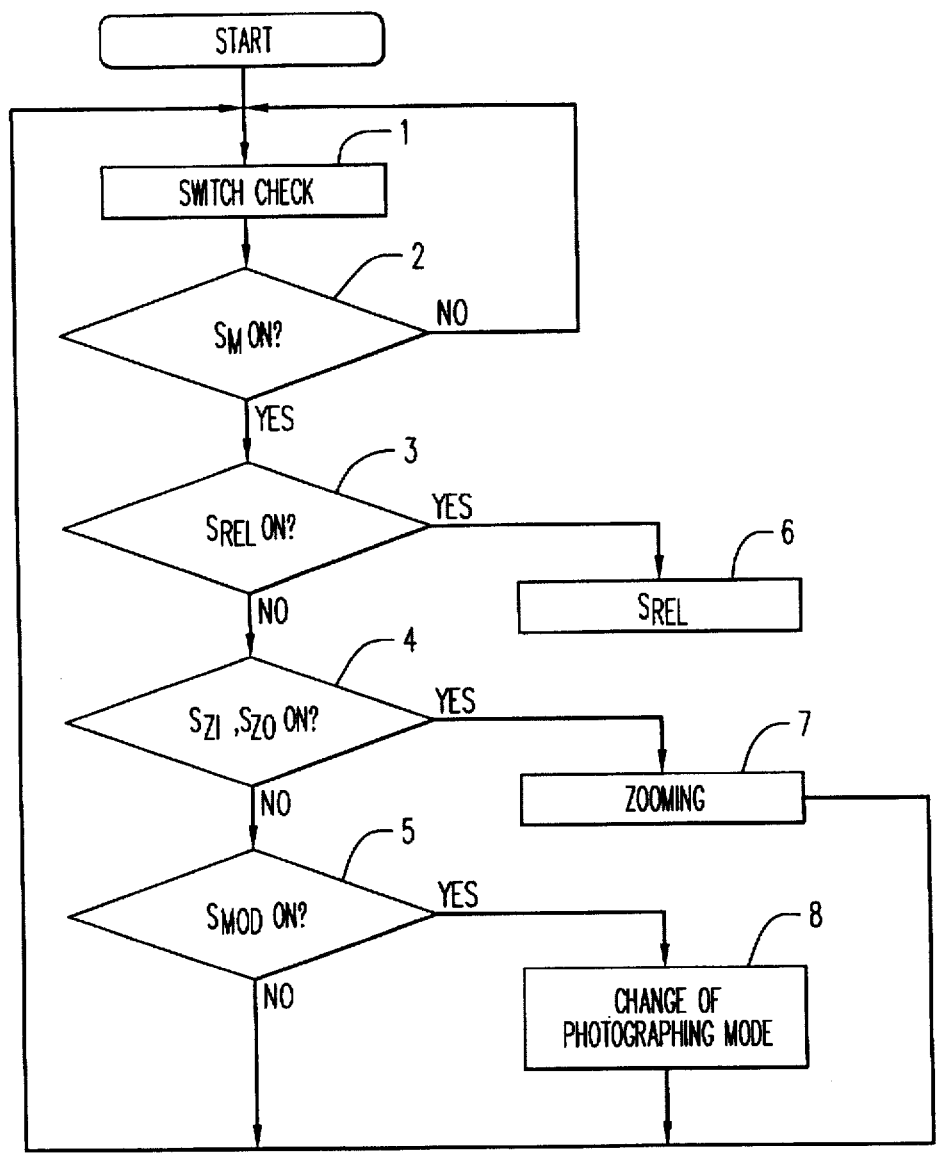
FIG. 4 is a flow chart showing a procedure for checking conditions of a plurality of switches of the auto focus camera.

FIG. 4 is a flow chart showing a procedure executed by the control circuit 11 for checking a condition of the plural switches. The control circuit 11 always reads and checks the condition of the plural switches (at step #1), and, if the main switch SM is OFF (No at step #2), the camera operation is stopped. When the release switch $S_{REL}$ is ON (Yes at step #3), a sequence of the release operation is started (at step #6). When a zoom-in switch $S_{ZI}$ or a zoom-out switch $S_{ZO}$ are ON (at step #4), the focal distance of the photographic lens 5 is changed (at step #7). When the mode switch $S_{MOD}$ is ON (at step #5), the photographing mode is changed (at step #8).

Figure 5:
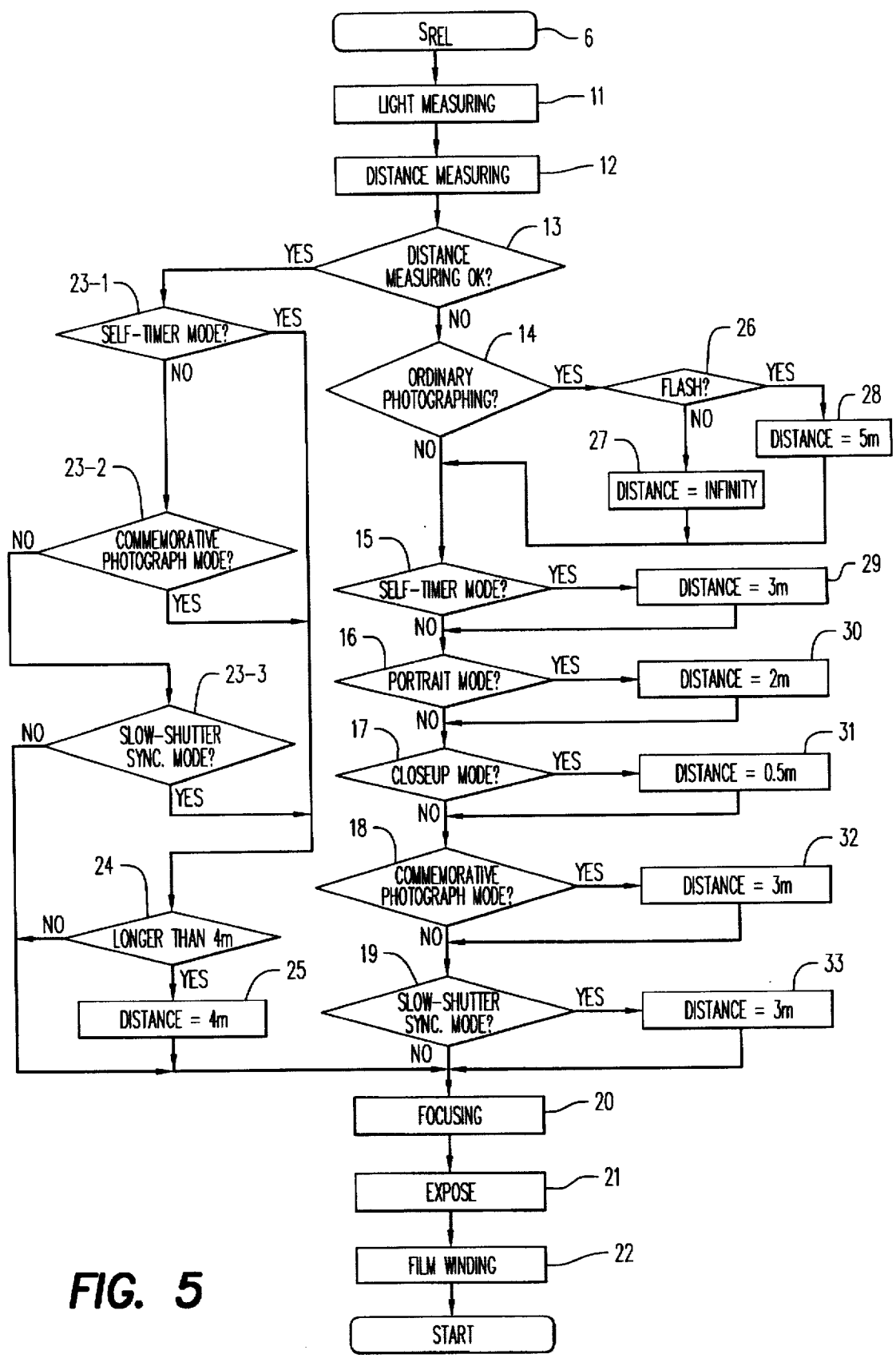

FIG. 5 is a flow chart showing a procedure of the release operation, when the release switch $S_{REL}$ is ON. Upon commencing the release operation, the control circuit 11 reads light measuring data from the light measuring unit 15 (at step #11) and reads distance measuring data measured by the distance measuring unit 14 (at step #12). In the control circuit 11, it is judged whether or not distance measuring can be done and whether or not the data is valid, by the above described method (at step #13). When it is judged that the distance measuring can be done and that the data is valid (Yes at step #13), it is judged whether or not it has high possibilities that a person is photographed (and comparatively the image magnification is small), based on the photographing mode. In other words, it is judged that photographing mode is the ordinary mode, the self timer mode, the commemorative photograph mode or the slow-shutter sync. mode (at steps #23-1, #23-2 and #23-3). If one of the photographing modes is selected, it is presumed that the person is photographed and it is examined that the distance measuring data is longer than 4 meters (at step #24). If it is longer than 4 meters (Yes at step #24), for preventing out of focus, the measuring distance data is limited compulsorily within 4 meters (at step #25) and the procedure goes to next step after the focusing operation (at step #20).

If the distance measuring data is not longer than 4 meters (No at step #24) and none of the photographing modes are selected (No at steps #23-1, #23-2 and #23-3), based on obtained light measuring data and distance measuring data; focusing (at step #20), exposuring (at step #21) and film winding (at step #22) operations are executed. The portrait mode is also for photographing a person, but, since the image magnification of its mode is comparatively high and one person is often photographed as an object, there is little likelihood of blur as for the object. Therefore, it is provided that the portrait mode are not included in the judging operation of whether or not a person is photographed at step #23-1, #23-2 and #23-3, and the distance limitation is not applied.

At step #13, owing to the object having low contrast and so on, if it is judged that distance measuring can not be done or that the distance data is invalid (No at step #13), as below mentioned, predetermined distance data corresponding to the photographing mode of the camera is selected and set (at steps 14-#19 and #26-#33). In accordance with set distance data, the focusing operation is executed (at step #20). Namely, if the ordinary mode is selected (Yes at step #14), it is examined whether or not a photographing with a flash light is set (at step #26). If it is not set a flash light photographing (No at step 26), the distance data is set at infinity (at step #27). If it is set a flash light photographing (Yes at step #26), the distance data is set at 5 meters (at step #28). 5 meters is mostly used in photographing. If the self timer mode is selected (Yes at step #15), since there is a likelihood of that the object is a person, 3 meters, which is often used in case of that a person is photographed, is selected (at step #29). If the portrait mode is selected (Yes at step #16), the distance data is set at 2 meter (at step #30). If the close-up mode is selected (Yes at step #17), the distance data is set at 0.5 meter (at step #31). If the commemorative photograph mode is selected (Yes at step #18), since there is a high possibility of that the object is a person, the distance data is set at 3 meters (at step #32). If the slow-shutter sync. mode is selected (Yes at step #19), as well as the commemorative photograph mode, the distance data is set at 3 meter (at step #33).

While, excepting the above mentioned method in which it is examined which photographing modes (the self timer mode, the commemorative photograph mode and the slow-shutter sync. mode) is selected, there is other method for judging that there is a likelihood of that an object is a person as follows. That is, in cases of that an main object is detected on the center of a photographing area in the distance measuring at a multiple points, that flesh color is detected in the center part of color of an object light and that photographing operation is carried out indoors with illuminating from a lamp or a fluorescent lamp, since there is a high possibility of that a person is photographed, it is determined to presume that a person is photographed. A presuming operation can be performed in the control circuit 11.

And, the above-mentioned focusing operation (at step #20) is executed by the focusing drive 18 as shown in FIG. 3. The exposure operation (at step #21) is performed by the exposure control unit 13. The film winding operation (at step #22) is carried out by the film feeding mechanism 16.

Also, the measuring means is composed of the auto focus optical system 2, the image sensor 3 and the distance measuring unit 14 in the above mentioned embodiment of FIG. 1 and FIG. 3. And the judging means and the distance selecting means constructed by the distance calculating device 4 and the control circuit 11, corresponding to the processes, at steps #13, #14-#19 and #27-#33. And the lens driving means is composed of the lens driving device 6 and the focusing drive 18.

Figure 6:
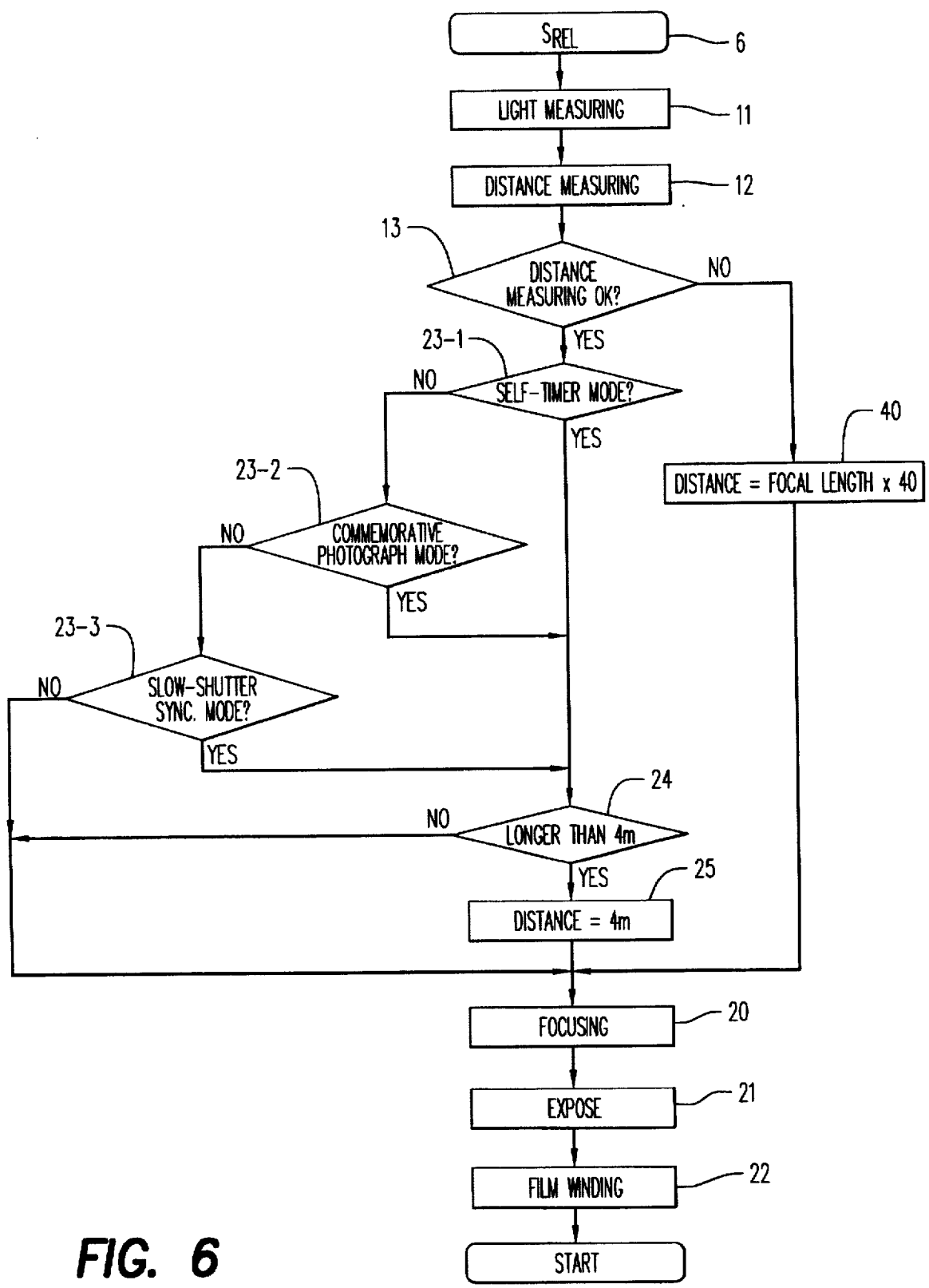
FIG. 6 is a flow chart showing a procedure when a release switch is ON in a modified embodiment.
Figure 7:
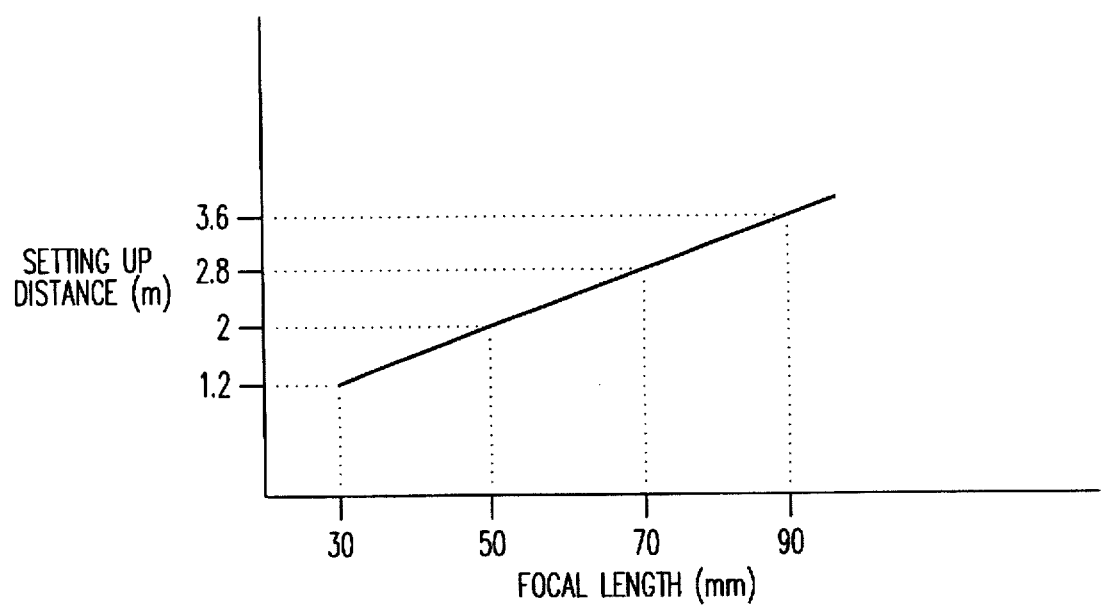
FIG. 7 is a view showing a relationship of a focal length and a setting up distance in the modified embodiment.

Next, referring to FIG. 6, it is described as to an modified embodiment in which how to set distance data is different from the above-mentioned embodiment, in case of judging that distance measuring can not be done or that the distance data is invalid. FIG. 6 is a flow chart showing another procedure of the release operation upon switching ON of the release switch $S_{REL}$. In FIG. 6, at same number steps as the above mentioned, same operations are performed. At step #13, when it is judged that distance measuring can not be done or that the distance data is invalid, it is supposed that the portrait mode is selected, and the distance is set, in which the magnification of an object image is 1/40, based on a focal length set with zooming by an operator (at step #40). The objective lens 5 is driven to focus to the set value (at step #20). FIG. 7 shows a relationship between the focal length of the photographic lens 5 and set distance by zooming. By the relationship, the magnification of the object image becomes 1/40.

Figure 8:
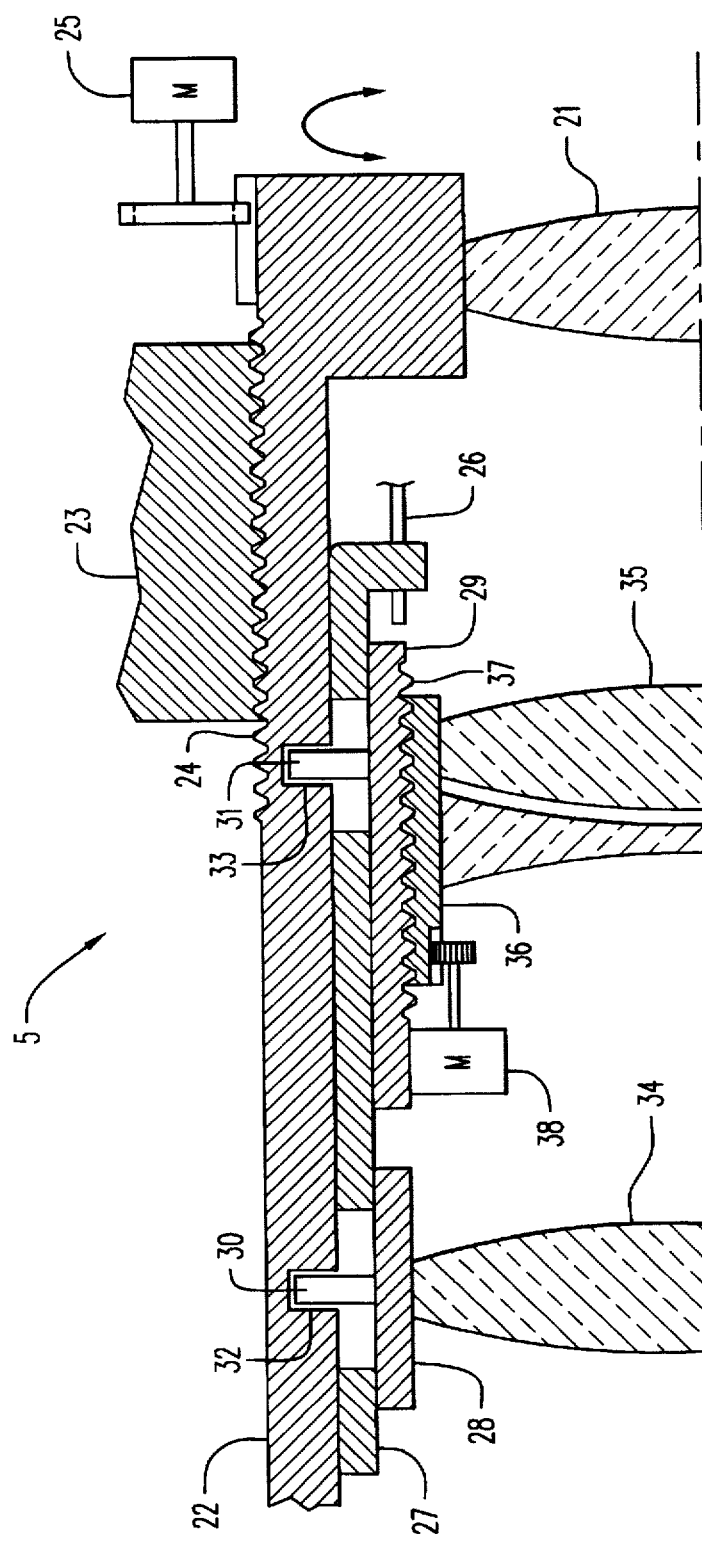
FIG. 8 is a vertical sectional view showing a zooming mechanism of the objective lens.

The focal length of the objective lens 5 set with zooming is obtained as below mentioned. FIG. 8 shows a schematic view of the objective lens 5 driven to zoom. A lens barrel 22 supporting a rear lens 21 is coupled rotationally on a fixed barrel 23 by a screw 24, and is movable forward and backward by rotating of a step motor 25 for zooming. A movable frame 27, which is movable forward and backward and being stopped not to rotate by a straight rod 26, is engaged on a inner face of the lens barrel 22. A holding frames 28 and 29 coupled to the frame 27 by a key are guided to be able to move independently to the front and the rear by engaging of guide pins 30 and 31 and spiral cam grooves 32 and 33 provided on the inner face of the lens barrel 22. The holding frame 28 holds a front lens 34. Also, on a inner face of the holding frame 29, an inside holding frame 36 for holding a focusing lens 35 is coupled rotationally by a screw 37. The inside holding frame 36 is movable forward and backward by rotating of AF motor 38. When a zooming operation is carried out by the operator, a zooming amount is corresponding to a driving amount of the step motor 25. Hence, the control circuit 11 has a data of the driving amount. Accordingly, the focal length data of the objective lens 5 by setting of zooming is obtained by the driving amount of the step motor 25.

Furthermore, in a camera having a remote control mode, upon setting the remote control mode, same control is performed as the above-mentioned in setting the self timer mode. And, if the flash is fired in the ordinary photographing mode, it is possible to obtain a flash reaching limit distance based on guide No. of flash (GNo.), F number of the objective lens and film sensitivity and, to set the focal length to the obtained distance. Also, it is possible to limit the distance obtained by the above-mentioned method to within 5 meters. By this operation, it is prevented that exposuring light is shortage in photographing with flash firing.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An auto focus camera in which a lens position is changeable in accordance with a photographing mode, comprising:

distance measuring means which measures an object distance;

judging means which judges whether or not distance measuring can be done;

estimating means which estimates whether or not a person is being photographed;

distance selecting means which selects distance data measured by the distance measuring means when distance measuring can be done, and selects first predetermined distance data when distance measuring can not be done and a person is being photographed, and selects second predetermined distance data when distance measuring can not be done and a person is not being photographed, and;

driving means which drives a photographic lens in accordance with selected measuring data.

2. An auto focus camera claimed in claim 1, wherein the estimating means estimates that, during a photographing with a self timer mode, a person is being photographed.

3. An auto focus camera claimed in claim 1, wherein the estimating means estimates that, during photographing with a slow-shutter synchronizing mode, a person is being photographed.

4. An auto focus camera claimed in claim 1, wherein the estimating means estimates that, during photographing with a commemorative photographing mode, a person is being photographed.

5. An auto focus camera claimed in claim 1, wherein the estimating means estimates that a person is photographed, in a case where distance measuring at a multiple points is applied and a main object is detected in the center of a distance measuring area.

6. An auto focus camera claimed in claim 1, wherein it is judged whether or not distance measuring can be done by the validity of the distance measuring data, and the validity is determined in accordance with whether or not distance measuring data is within a range of a predetermined value.

7. An auto focus camera in which a lens position is changeable in accordance with a photographing mode, comprising:

distance measuring means which measures an object distance;

judging means which judges whether or not distance measuring can be done;

estimating means which estimates whether or not a person is being photographed;

distance selecting means by which, when distance measuring can be done, upon an estimation that a person is being photographed by the estimating means, if the distance measuring data is more than the value of predetermined data, the predetermined data is selected and, if the distance measuring data is not more than the value of the predetermined data, the distance measuring data is selected, and also, when distance measuring can not be done, predetermined distance data corresponding to a selected photographing mode is selected, and;

driving means which drives a photographic lens in accordance with selected distance data.

8. An auto focus camera in which a lens position is changeable in accordance with a photographing mode, comprising;

distance measuring means which measures an object distance;

judging means which judges whether or not distance measuring can be done;

distance selecting means which selects distance data measured by the distance measuring means when distance measuring can be done, and selects predetermined distance data corresponding to a focal length of a photographic lens when distance measuring can not be done, and;

driving means which drives the objective lens in accordance with selected distance data.

9. An auto focus camera claimed in claim 8, wherein the predetermined distance data is determined by a focal length of the photographic lens and a predetermined magnification of an object image.

10. An auto focus camera claimed in claim 8, wherein the focal length is obtained by a driving amount of a motor for zooming the photographic lens.

11. An auto focus camera in which a lens position is changeable in accordance with a photographing mode, comprising;

distance measuring means which measures an object distance;

judging means which judges whether or not distance measuring can be done;

photographing mode selecting means which selects an ordinary mode or a close-up mode with which an object is photographed at closer range than with the ordinary mode;

distance selecting means which selects distance data measured by the distance measuring means when distance measuring can be done, and selects predetermined distance data corresponding to the selected photographing mode when distance measuring can not be done, and;

driving means which drives a photographic lens in accordance with selected distance data.

12. An auto focus camera as claimed in claim 11, in which a predetermined distance in case of the ordinary mode is longer than a predetermined distance in case of the close-up mode.

13. An auto focus camera in which a lens position is changeable in accordance with a photographing mode, comprising;

distance measuring means which measures an object distance;

judging means which judges whether or not distance measuring can be done;

photographing mode selecting means which selects an ordinary mode or a self timer mode;

distance selecting means which selects distance data measured by the distance measuring means when distance measuring can be done, and selects predetermined distance data corresponding to the selected photographing mode when distance measuring can not be done, and;

driving means which drives a photographic lens in accordance with selected distance data.

14. An auto focus camera in which a lens position is changeable in accordance with a photographing mode, comprising;

distance measuring means which measures an object distance;

judging means which judges whether or not distance measuring can be done;

photographing mode selecting means which selects an ordinary mode or a portrait mode;

distance selecting means which selects distance data measured by the distance measuring means when distance measuring can be done, and selects a predetermined distance data corresponding to the selected photographing mode when distance measuring can not be done, and;

driving means which drives a photographic lens in accordance with selected distance data.

15. An auto focus camera in which a lens position is changeable in accordance with a photographing mode, comprising;

distance measuring means which measures an object distance;

judging means which judges whether or not distance measuring can be done;

photographing mode selecting means which selects an ordinary mode or a commemorative photograph mode;

distance selecting means which selects distance data measured by the distance measuring means when distance measuring can be done, and selects predetermined distance data based on selected photographing mode when distance measuring can not be done, and;

driving means which drives a photographic lens in accordance with selected distance data.

16. An auto focus camera in which a lens position is changeable in accordance with a photographing mode, comprising;

distance measuring means which measures an object distance;

judging means which judges whether or not distance measuring can be done;

photographing mode selecting means which selects an ordinary mode or a slow-shutter synchronizing mode;

distance selecting means which selects distance data measured by the distance measuring means when distance measuring can be done, and selects predetermined distance data corresponding to the selected photographing mode when distance measuring can not be done, and;

driving means which drives a photographic lens in accordance with selected distance data.

* * * * *